(12) United States Patent
Abe

(10) Patent No.: US 10,948,704 B2
(45) Date of Patent: Mar. 16, 2021

(54) OBJECTIVE FOR A CONFOCAL MICROSCOPE

(71) Applicant: OLYMPUS CORPORATION, Hachioji (JP)

(72) Inventor: Kenichiro Abe, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 169 days.

(21) Appl. No.: 16/385,836

(22) Filed: Apr. 16, 2019

(65) Prior Publication Data

US 2019/0324243 A1     Oct. 24, 2019

(30) Foreign Application Priority Data

Apr. 19, 2018   (JP) .............................. JP2018-080953

(51) Int. Cl.
| | | |
|---|---|---|
| *G02B 21/02* | (2006.01) | |
| *G02B 21/00* | (2006.01) | |
| *G02B 9/64* | (2006.01) | |
| *G02B 27/00* | (2006.01) | |

(52) U.S. Cl.
CPC .......... *G02B 21/0072* (2013.01); *G02B 9/64* (2013.01); *G02B 21/0076* (2013.01); *G02B 21/02* (2013.01); *G02B 27/0025* (2013.01)

(58) Field of Classification Search
None
See application file for complete search history.

(56) References Cited

U.S. PATENT DOCUMENTS

| | | | | |
|---|---|---|---|---|
| 3,883,231 A | * | 5/1975 | Koizumi ................ | G02B 21/02 359/660 |
| 5,657,166 A | * | 8/1997 | Otaki .................. | G02B 21/0088 359/661 |
| 7,382,542 B2 | | 6/2008 | Wartmann | |
| 2002/0024744 A1 | * | 2/2002 | Kasahara ............... | G02B 21/02 359/656 |
| 2007/0091454 A1 | | 4/2007 | Vvartmann | |
| 2008/0080061 A1 | * | 4/2008 | Miyano ................ | G02B 23/243 359/661 |
| 2008/0149867 A1 | | 6/2008 | Konishi et al. | |
| 2009/0032732 A1 | | 2/2009 | Konishi et al. | |
| 2010/0177404 A1 | | 7/2010 | Fujimoto | |

FOREIGN PATENT DOCUMENTS

| | | |
|---|---|---|
| JP | 2008170969 A | 7/2008 |
| JP | 2010186162 A | 8/2010 |

\* cited by examiner

*Primary Examiner* — Darryl J Collins
(74) *Attorney, Agent, or Firm* — Holtz, Holtz & Volek PC

(57) ABSTRACT

An objective includes: a first lens group that includes a meniscus lens component that is the closest to an image among lens components of the first lens group, the meniscus lens component having a convex surface facing an object; and a second lens group that is closer to the image than the first lens group is, and the objective satisfies the following conditional expressions:

$$0 \leq |\Delta z_1|/DOF_e \leq 1.5 \qquad (1)$$

$$0 \leq |\Delta z_2|/DOF_e \leq 2 \qquad (2)$$

where $\Delta z_1$ indicates a difference between a h-line minimization position and an e-line minimization position; $\Delta z_2$, a difference between a position on then optical axis at which an RMS wavefront aberration in light having a wavelength of 800 nm is minimized and the e-line minimization position; $DOF_e$, a depth of focus for the e line.

20 Claims, 11 Drawing Sheets

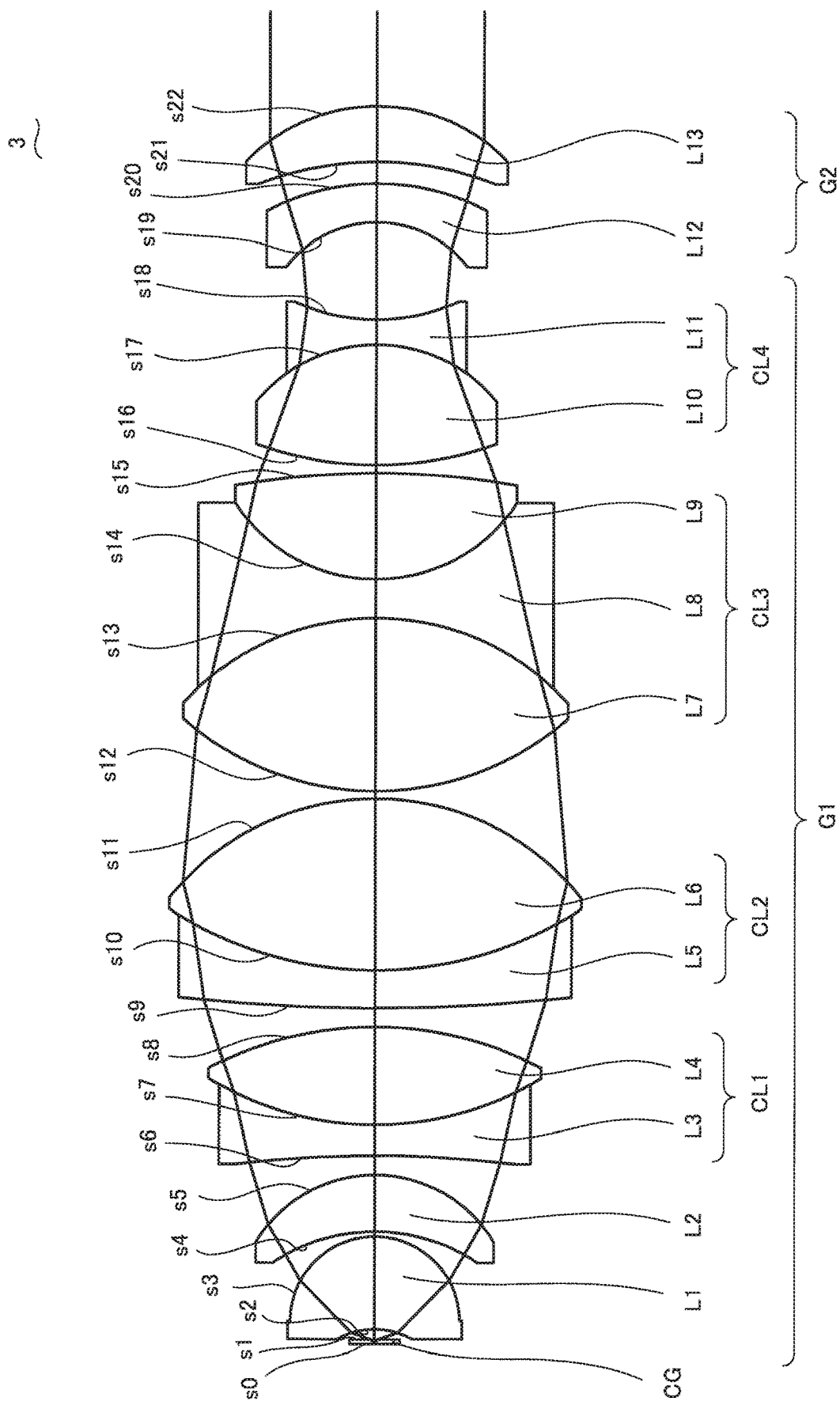
F I G. 6

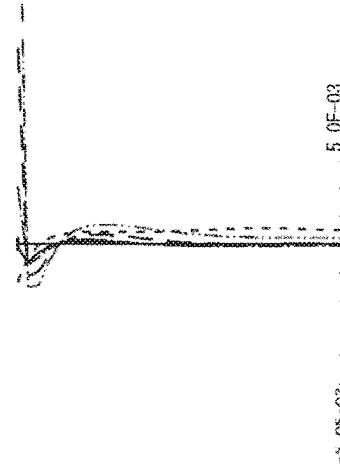
FIG. 11A SPHERICAL ABERRATION NA 1.453
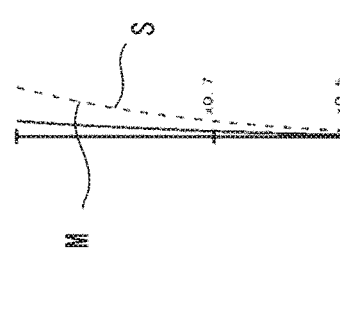
FIG. 11B SINE-CONDITION VIOLATION AMOUNT NA 1.453
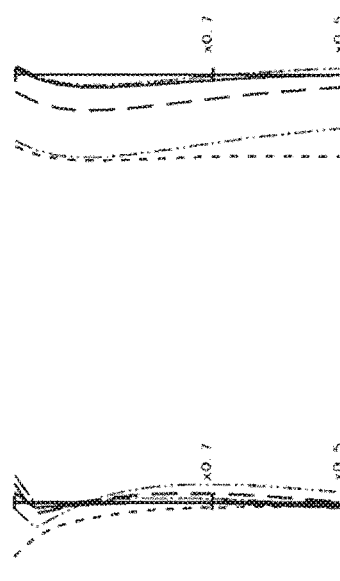
FIG. 11C ASTIGMATISM OBJECT HEIGHT 0.13 [mm]
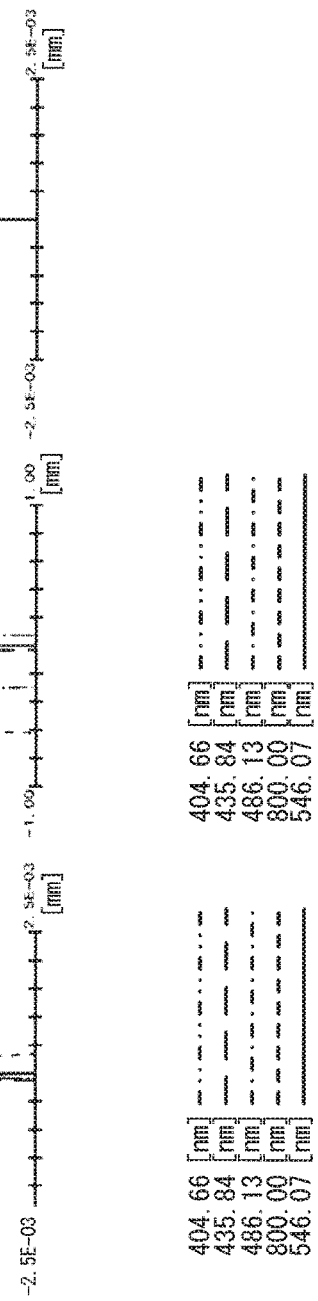
FIG. 11D COMA ABERRATION OBJECT HEIGHT 0.08 [mm]

OBJECTIVE FOR A CONFOCAL MICROSCOPE

CROSS REFERENCE TO RELATED APPLICATIONS

This application is based upon and claims the benefit of priority from prior Japanese Patent Application No. 2018-080953, filed Apr. 19, 2018, the entire contents of which are incorporated herein by this reference.

BACKGROUND OF THE INVENTION

Field of the Invention

The disclosure herein relates to an objective.

Description of the Related Art

Confocal microscopes for fluorescence observations have attracted attention in the field of biological microscopes in recent years. A confocal microscope has high resolutions for an XY direction orthogonal to the optical axis of an objective and a Z direction parallel to the optical axis. In addition, a confocal microscope may be used in an application in which a plurality of images obtained through the repetition of three-dimensional movement of a stage and image capturing are pieced together to analyze the three-dimensional structure of a sample having a large volume.

For this application, an objective to be used for the confocal microscope will desirably have sufficiently small axial chromatic aberrations for both an excitation wavelength and a fluorescence wavelength. Meanwhile, to analyze the three-dimensional structure of a large sample in a short time, the objective is required to provide a wide field of view and have a preferable aberration performance for the wide range.

A conventional objective that corrects chromatic aberrations in a preferable manner for a wide wavelength region is described in, for example, U.S. Patent Publication No. 2007/0091454.

SUMMARY OF THE INVENTION

An objective in accordance with an aspect of the present invention includes: a first lens group that includes a meniscus lens component that is the closest to an image among lens components of the first lens group, the meniscus lens component having a convex surface facing an object; and a second lens group that is closer to the image than the first lens group is. The objective satisfies the following conditional expressions:

$$0 \leq |\Delta z_1|/DOF_e \leq 1.5 \quad (1)$$

$$0 \leq |\Delta z_2|/DOF_e \leq 2 \quad (2)$$

In these conditional expressions, $\Delta z_1$ indicates a difference between a position on an optical axis at which an RMS wavefront aberration in an h line is minimized and a position on the optical axis at which an RMS wavefront aberration in an e line is minimized; $\Delta z_2$, a difference between a position on the optical axis at which an RMS wavefront aberration in light having a wavelength of 800 nm is minimized and the position on the optical axis at which an RMS wavefront aberration in the e line is minimized; $DOF_e$, a depth of focus for the e line.

BRIEF DESCRIPTION OF THE DRAWINGS

The present invention will be more apparent from the following detailed description when the accompanying drawings are referenced.

FIG. 6 is a cross-sectional view of an objective 3 in accordance with a third embodiment of the invention;

FIGS. 9A-9D are each an aberration diagram for the objective 4 depicted in FIG. 8;

FIGS. 11A-11D are each an aberration diagram for the objective 5 depicted in FIG. 10.

DESCRIPTION OF THE EMBODIMENTS

Figure 1:
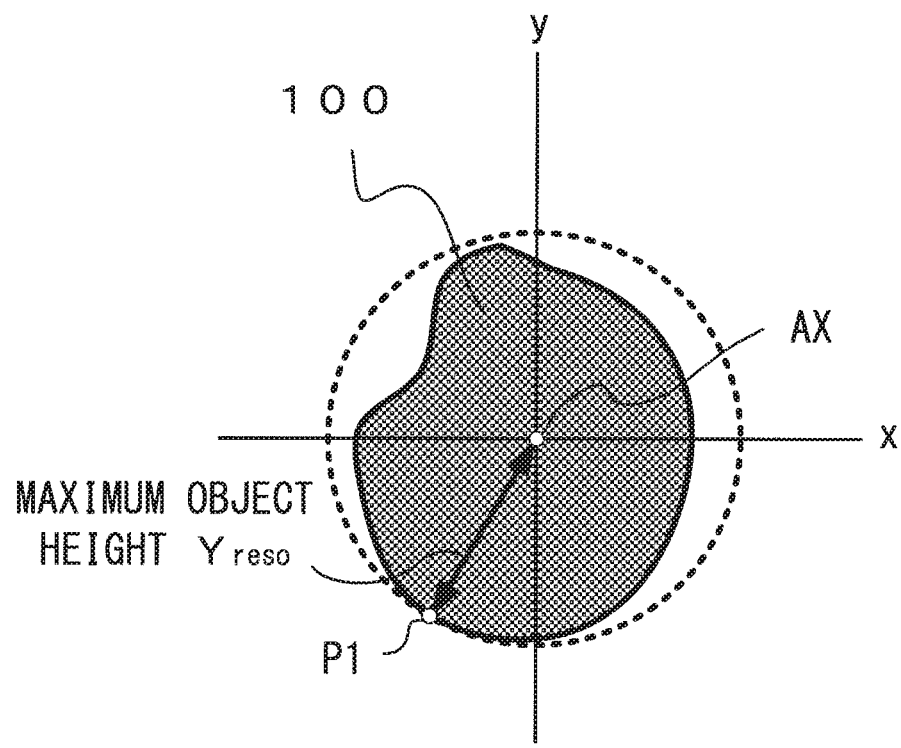
FIG. 1 illustrates a maximum object height $Y_{reso}$.

The objective described in U.S. Patent Publication No. 2007/0091454 cannot sufficiently correct an axial chromatic aberration in a short wavelength region. Hence, if this objective is used for a confocal microscope, it will be difficult to perform a confocal observation with a sufficient resolution especially in a short wavelength region.

The following describes an objective in accordance with an embodiment of the present application. The objective in accordance with the embodiment (hereinafter simply referred to as an objective) is an infinity-corrected microscope objective to be used in combination with a tube lens.

The objective includes: a first lens group that includes a meniscus lens component that is the closest to an image among the lens components of the first lens group, the meniscus lens component having a convex surface facing an object; and a second lens group that is closer to the image than the first lens group is. More particularly, the meniscus lens component that is the closest to the image among lens components of the first lens group has a lens outer diameter such that the lens outer diameter divided by a thickness that the meniscus lens component has on an optical axis is 4 or lower. When the meniscus lens component is a cemented lens, the outer diameter of the meniscus lens component refers to the outer diameter of a lens that is the closest to the image among the lenses that constitute the meniscus lens component. When the first lens group includes a plurality of meniscus lens components each having a lens outer diameter such that the lens outer diameter divided by a thickness that the meniscus lens component has on the optical axis is 4 or lower, the meniscus lens component that is the closest to the image among the lens components of the first lens group refers to the meniscus lens component that is the closest to the image among the plurality of meniscus lens components. A border between the first and second lens groups may be identified in accordance with this feature.

The first lens group applies a converging effect therewithin to a pencil of diverging light rays from an object point. Subsequently, the first lens group decreases a marginal ray height of the pencil of converging light rays within the meniscus lens component that is the closest to the image among the lens components of the first lens group and then emits the pencil of light rays from the concave surface of the meniscus lens component toward the second lens group. In addition, the second lens group turns the pencil of light rays from the first lens group into a pencil of parallel light rays. Accordingly, a Petzval sum can be corrected effectively, with the result that field curvatures can be corrected in a preferable manner for the entirety of a wide field of view.

The pencil of light herein refers to a pencil of light rays emitted from one point of an object (object point). Whether a single lens or a cemented lens, a lens component refers to one lens block that includes lens surfaces through which a light ray from an object point passes, wherein only a surface on an object side and a surface on an image side among these lens surfaces, i.e., only two of these lens surfaces, are in contact with air (or immersion liquid).

The objective satisfies the following conditional expressions:

$$0 \leq |\Delta z_1|/DOF_e \leq 1.5 \tag{1}$$

$$0 \leq |\Delta z_2|/DOF_e \leq 2 \tag{2}$$

In these conditional expressions, $\Delta z_1$ indicates a difference between an h-line minimization position and an e-line minimization position, i.e., the distance between these positions, provided in counterlight tracking; $DOF_e$, a depth of focus for an e line. The h-line minimization position is a position on an optical axis at which an RMS wavefront aberration in the h line is minimized in counterlight tracking, wherein the h-line minimization position is a position on the optical axis within a region on the object side of the objective. The e-line minimization position is a position on the optical axis at which an RMS wavefront aberration in the e line is minimized in counterlight tracking, wherein the e-line minimization position is a position on the optical axis within a region on the object side of the objective. $\Delta z_2$ indicates a difference provided in counterlight tracking between a position on the optical axis at which an RMS wavefront aberration in light having a wavelength of 800 nm is minimized and the e-line minimization position. Depth of focus $DOF_e$ is calculated by $DOF_e = n_{im} \times \lambda_e/(2 \times NA_{ob}^2)$, where $NA_{ob}$ indicates the numerical aperture of the object side of the objective; $\lambda_e$, the wavelength of the e line; $n_{im}$, the refractive index of an immersion liquid. Note that $n_{im}=1$ when the objective is a dry objective.

Conditional expression (1) is intended mainly to correct an axial chromatic aberration in a preferable manner. A biological confocal-microscope optical system is such that when chromatic aberrations have occurred in an excitation wavelength and a fluorescence wavelength, a resolution is decreased, and in addition a signal strength is extremely decreased. This makes it very difficult to perform a structure analysis for a depth direction (z direction). In the field of biological microscopes, fluorescence observations are often performed using excitation light having a short wavelength close to the h line. Hence, axial chromatic aberration properties that an objective has for an h line and an e line are important in performing a structure analysis with a high resolution using a confocal microscope for a range from a short wavelength region to a visible region.

When $|\Delta z_1|/DOF_e$ is higher than an upper limit of conditional expression (1), an excessively large axial chromatic aberration will be caused by the objective. Hence, without significantly compensating for the axial chromatic aberration by using a tube lens or optical systems within the confocal microscope apparatus such as a scanning optical system, a large axial chromatic aberration would occur on an image surface. However, it is difficult in practice to compensate for a large axial chromatic aberration by using an optical system disposed within the apparatus. Compensating for an aberration by using an optical system disposed within the apparatus means providing this optical system with an aberration. Hence, considering that a plurality of objectives are switched between, it is not preferable to compensate for an axial chromatic aberration by using an optical system disposed within the apparatus. Satisfying conditional expression (1) allows the objective alone to correct an axial chromatic aberration in a preferable manner, and in particular, an axial chromatic aberration can be corrected in a preferable manner even when light having a short wavelength such as the h line is used as excitation light.

Conditional expression (2) is intended mainly to correct an axial chromatic aberration in a near-infrared region in a preferable manner. When $|\Delta z_2|/DOF_e$ is higher than an upper limit of conditional expression (2), an extremely large axial chromatic aberration will occur in the near-infrared region.

Satisfying conditional expression (2) in addition to conditional expression (1) allows an axial chromatic aberration to be corrected in a preferable manner for a wider wavelength region. Hence, high chromatic aberration properties can be achieved simultaneously for both a short wavelength region and a long wavelength region. Accordingly, a preferable observation and analysis can be performed even when, for example, multi-wavelength excitation is performed using a confocal microscope within a range from a short wavelength to a long wavelength.

The objective desirably satisfies conditional expression (1-1) or (1-2) instead of conditional expression (1). The objective also desirably satisfies conditional expression (2-1) or (2-2) instead of conditional expression (2).

$$0 \leq |\Delta z_1|/DOF_e \leq 1.3 \tag{1-1}$$

$$0 \leq |\Delta z_1|/DOF_e \leq 1 \tag{1-2}$$

$$0 \leq |\Delta z_2|/DOF_e \leq 1.5 \tag{2-1}$$

$$0 \leq |\Delta z_2|/DOF_e \leq 1 \tag{2-2}$$

The objective configured as described above can correct aberrations in a preferable manner for a wide wavelength region and a wide field of view. Hence, the objective is preferable for a fluorescence observation using a confocal microscope.

The objective may satisfy the following conditional expression instead of conditional expression (2):

$$9 \text{ mm} \leq Y_{reso} \times |\beta| \leq 20 \text{ mm} \tag{3}$$

In this conditional expression, $Y_{reso}$ indicates a maximum object height within a region on a plane orthogonal to an optical axial that crosses an e-line minimization position, the region having an RMS wavefront aberration in the e line that is $0.2\lambda_e$ or less provided therewithin when counterlight tracking is performed; $\lambda_e$, the wavelength of the e line; $\beta$, the magnification of the objective. Note that the magnification of the objective refers to a magnification achieved when the objective is combined with a tube lens having a focal length of 180 mm.

Maximum object height $Y_{reso}$ is a maximum object height within a region 100 that satisfies a predetermined condition, as indicated in FIG. 1. Note that FIG. 1 indicates a cross section orthogonal to an optical axis of the objective that crosses the e-line minimization position (hereinafter referred to as an e-line minimization cross section). Maximum object height $Y_{reso}$ is calculated as follows: First, (RMS wavefront aberration in the e line)/$\lambda_e$ is calculated for each point on the e-line minimization cross section. Second, a region 100 on the e-line minimization cross section that satisfies (RMS wavefront aberration in the e line)/$\lambda_e \leq 0.2$ is identified. Third, a point within the region 100 that is the most distant from an optical axis AX is identified as a point P1. Finally, the distance between the point P1 and the optical axis AX is calculated as maximum object height $Y_{reso}$.

When the objective has rotational symmetry, the region 100 also has rotational symmetry (i.e., a circular shape). Accordingly, the region 100 has a constant object height irrespective of orientation, and maximum object height $Y_{reso}$ is this constant object height. Meanwhile, when the objective has a manufacturing error, the region 100 has rotational asymmetry. As a result, the region 100 has an object height that depends on an orientation, as depicted in, for example, FIG. 1. In this case, maximum object height $Y_{reso}$ is an object height in an orientation in which the distance from the optical axis to a border of the region 100 is maximized.

Conditional expression (3) is intended to perform a structure analysis of a sample having a wide area in a short time. To perform a structure analysis of a sample having a wide area in a short time, an image needs to be captured in each single frame for a wide range at a high resolution. Satisfying conditional expression (3) allows a preferable edge-portion resolution to be achieved in an observation using the objective so that an image can be captured for a wide field of view at a high resolution.

When $Y_{reso} \times |\beta|$ is lower than a lower limit of conditional expression (3), an excessively large off-axis aberration is caused by the objective, and the aberration needs to be significantly compensated for using a tube lens. However, it is difficult in practice to compensate for a large off-axis aberration by using a tube lens. Meanwhile, compensating for an aberration by using a tube lens means providing the tube lens with an aberration, and this is unfavorable for the reason described above with reference to conditional expression (1). When $Y_{reso} \times |\beta|$ is higher than an upper limit of conditional expression (3), a wide region with a preferable off-axis aberration is achieved in a primary image-forming position. However, it would not be preferable to obtain an image for this range because image sensors and units for holding the same would be large-sized.

The objective desirably satisfies conditional expression (3-1) or (3-2) instead of conditional expression (3)

$$9.5 \text{ mm} \leq Y_{reso} \times |\beta| \leq 17 \text{ mm} \quad (3\text{-}1)$$

$$10 \text{ mm} \leq Y_{reso} \times |\beta| \leq 15 \text{ mm} \quad (3\text{-}2)$$

The first lens group of the objective configured as described above desirably includes a first lens component that is the closest to an object among the lens components of the first lens group, the first lens component having a convex surface facing an image. The objective desirably satisfies the following conditional expression:

$$1.5 \leq n_1 \leq 1.85 \quad (4)$$

In this conditional expression, $n_1$ indicates the highest of the refractive indexes that the lenses included in the first lens component have for an e line. Accordingly, when the first lens component is a single lens, $n_1$ indicates the refractive index that the single lens has for the e line; when the first lens component is a cemented lens, $n_1$ indicates the higher of the refractive indexes that the lenses constituting the cemented lens have for the e line.

By satisfying conditional expression (4), a spherical aberration can be corrected in a more preferable manner, and a fluorescence observation can be performed at a short wavelength with a high resolution. An optical material that has a high refractive index typically features high absorption and strong autofluorescence for a short wavelength. Accordingly, a material having a refractive index that is not excessively high is preferably used to achieve a high SN ratio in a fluorescence observation using excitation light having a short wavelength.

When $n_1$ is not higher than an upper limit of conditional expression (4), a fluorescence image with a high SN ratio is obtained such that a fluorescence observation and a structure analysis can be performed with a high resolution. When $n_1$ is not lower than a lower limit of conditional expression (4), divergence of light rays emitted from the first lens component can be limited while reducing generation of spherical aberrations in the first lens component. This allows the spherical aberrations to be corrected in a preferable manner throughout the objective.

The second lens group desirably includes a plurality of lens components. An objective typically largely corrects a coma aberration by means of a lens component close to an image surface. By the second lens group including a plurality of lens components, the intervals between these lens components can be adjusted. Hence, a variation in a coma aberration that could be caused by a manufacturing error in, for example, the lens thickness or the radius of curvature can be appropriately compensated for by adjusting the intervals between the lens components of the second lens group.

The objective desirably includes a cemented triplet lens and desirably satisfies the following conditional expression, where $NA_{ob}$ indicates the numerical aperture of the object side of the objective:

$$0.5 \leq NA_{ob} \quad (5)$$

An objective that has a high numerical aperture satisfying conditional expression (5) will have a short depth of focus. Hence, chromatic aberrations need to be corrected more accurately. By the objective including a cemented triplet lens, the cemented triplet lens can function as an achromatic lens component such that chromatic aberrations can be corrected effectively by using the space within the objective effectively. Disposing the achromatic lens component within a region in which a high marginal ray height is provided allows the achromatic lens component to achieve a sufficient function, but disposing the achromatic lens component within such a region will inevitably result in a large lens diameter. Using a cemented triplet lens as the achromatic lens component allows high lens component stiffness to be maintained even with a large lens diameter.

The cemented triplet lens desirably consists of a negative lens and two positive lenses having the negative lens situated therebetween. In particular, the cemented triplet lens desirably consists of a positive lens, a negative lens, and a positive lens, wherein an object, the positive lens, the negative lens, and the positive lens are arranged in this order. The configuration of the positive-negative-positive cemented triplet lens allows the lens surfaces of the two sides of the negative lens to correct a chromatic aberration. Hence, the cemented triplet lens allows chromatic aberrations to be corrected more effectively.

The objective may be an immersion objective that satisfies conditional expression (6). In this case, the objective desirably satisfies conditional expression (7), where $f_{ob}$ indicates a focal length that the objective has for an e line, and $f_1$ indicates a focal length that the first lens component has for the e line.

$$1 \leq NA_{ob} \qquad (6)$$

$$-0.2 \leq f_{ob}/f_1 \leq 0.43 \qquad (7)$$

The immersion objective with a high numerical aperture that satisfies conditional expression (6) needs to limit divergence of light rays while considerably reducing generation of spherical aberrations. By satisfying conditional expression (7), the objective can correct spherical aberrations and axial chromatic aberrations effectively while correcting the Petzval sum in a more preferable manner.

When $f_{ob}/f_1$ is not lower than a lower limit of conditional expression (7), divergence of a pencil of light rays emitted from the first lens component can be prevented from becoming excessively large. Hence, an axial marginal ray height does not become excessively high within the optical systems closer to an image than the first lens component is (hereinafter referred to as optical systems of the second lens component and the following optical systems), so that spherical aberrations and axial chromatic aberrations can be corrected in a preferable manner. When $f_{ob}/f_1$ is not higher than an upper limit of conditional expression (7), a difference of elevation in axial marginal ray height can be easily provided within the optical systems of the second lens component and the following optical systems. Hence, the Petzval sum can be corrected in a preferable manner. In particular, the lens surface that is the closest to the object among the lens surfaces of the immersion objective is in contact with an immersion liquid, and hence a refractive index difference becomes small, with the result that the first lens component cannot remarkably correct the Petzval sum. Accordingly, it is desirable that the optical systems of the second lens component and the following optical systems correct the Petzval sum.

The objective desirably satisfies conditional expression (7-1) or (7-2) instead of conditional expression (7).

$$-0.1 \leq f_{ob}/f_1 \leq 0.38 \qquad (7\text{-}1)$$

$$0 \leq f_{ob}/f_1 \leq 0.34 \qquad (7\text{-}2)$$

The objective may be a dry objective that satisfies conditional expression (8). In this case, the objective desirably includes at least one lens component that can be moved along an optical axis.

$$0.85 \leq NA_{ob} < 1 \qquad (8)$$

The dry objective with a high numerical aperture that satisfies conditional expression (8) has a spherical aberration that may be largely varied due to a slight change in the thickness or refractive index of cover glass. By the objective including at least one lens component that can be moved along the optical axis (hereinafter referred to as a movable lens component), variations in spherical aberrations can be compensated for in accordance with the movement of the movable lens component.

The following specifically describes embodiments of the objective.

First Embodiment

Figure 2:
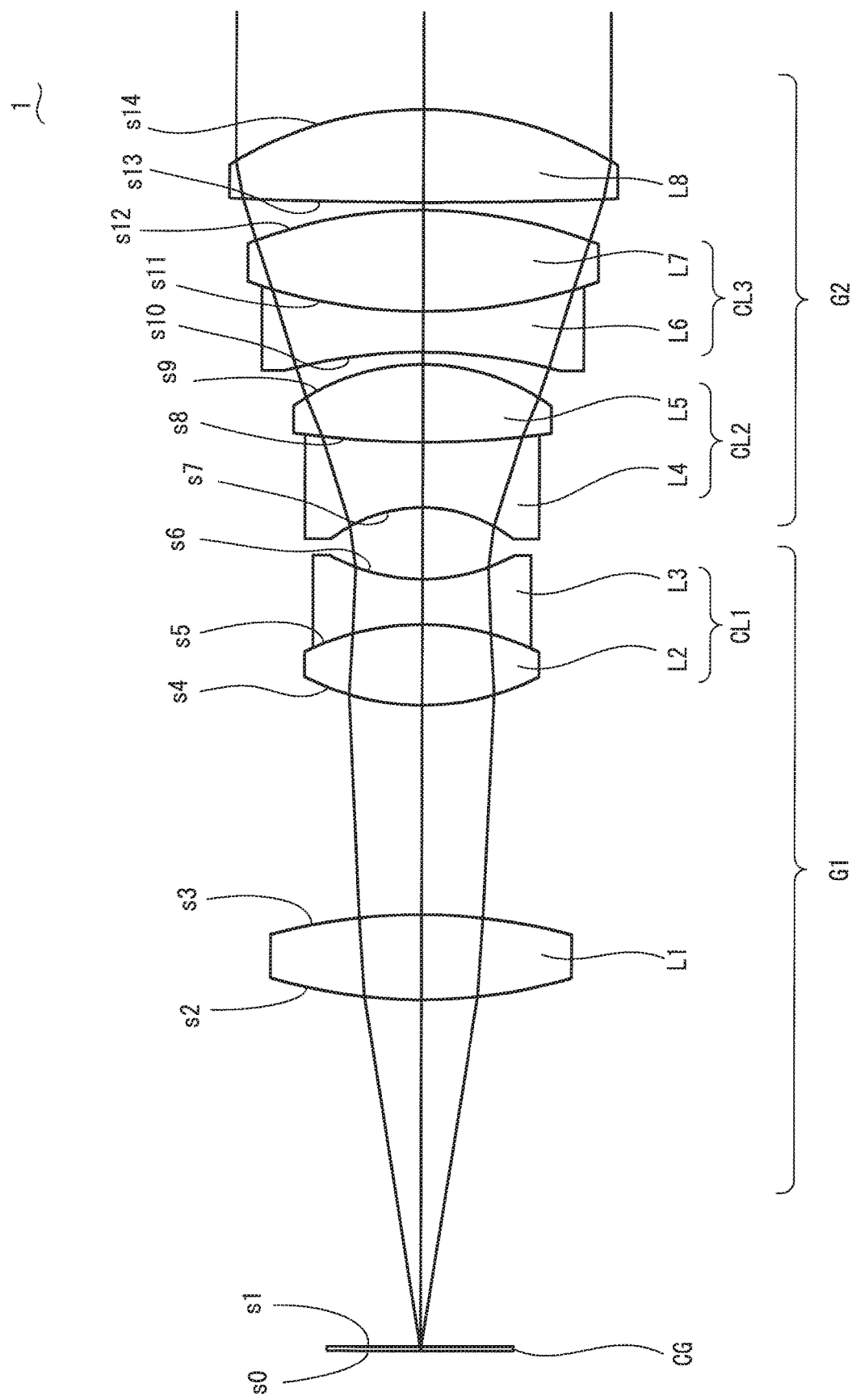
FIG. 2 is a cross-sectional view of an objective 1 in accordance with a first embodiment of the invention.

FIG. 2 is a cross-sectional view of an objective 1 in accordance with the present embodiment. The objective 1 includes: a first lens group G1 that includes a meniscus lens component that is the closest to an image among the lens components of the first lens group G1, the meniscus lens component having a convex surface facing an object; and a second lens group G2 that is closer to the image than the first lens group G1 is. Note that the objective 1 is a dry microscope objective.

The first lens group G1 includes a lens L1 that is a biconvex lens and a cemented lens CL1, wherein the object, the lens L1, and the cemented lens CL1 are arranged in this order. The lens L1 is a first lens component of the objective 1. The cemented lens CL1 is a cemented doublet lens and consists of a lens L2 that is a biconvex lens and a lens L3 that is a biconcave lens, wherein the object, the lens L2, and the lens L3 are arranged in this order.

The second lens group G2 includes a cemented lens CL2, a cemented lens CL3, and a lens L8 that is a biconvex lens, wherein the object, the cemented lens CL2, the cemented lens CL3, and the lens L8 are arranged in this order. The cemented lens CL2 is a cemented doublet lens and consists of a lens L4 that is a biconcave lens and a lens L5 that is a biconvex lens, wherein the object, the lens L4, and the lens L5 are arranged in this order. The cemented lens CL3 is a cemented doublet lens and consists of a lens L6 that is a biconcave lens and a lens L7 that is a biconvex lens, wherein the object, the lens L6, and the lens L7 are arranged in this order.

The following are various data on the objective 1, where $f_{G1}$ indicates a focal length that the first lens group has for an e line, $f_{G2}$ indicates a focal length that the second lens group has for the e line, and $\Phi_1$ indicates the outer diameter of the lens L3, i.e., the lens that is the closest to the image among the lenses constituting the cemented lens CL1, wherein the cemented lens CL1 is the meniscus lens component that is the closest to the image among the lens components of the first lens group G1.

$NA_{ob}$=0.160, $f_{ob}$=45.000 mm, $|\Delta z_1|$=3.3 μm, $|\Delta z_2|$=6.6 μm, $DOF_e$=10.66 μm, $Y_{reso}$=3.2 mm, $|\beta|$=4, $n_1$=1.51825, $f_1$=21.069 mm, $f_{G1}$=21.637 mm, $f_{G2}$=56.531 mm, $\Phi_1$=9 mm The following are lens data of the objective 1. INF in the lens data indicates infinity (∞).

| | | | Objective 1 | | | |
|---|---|---|---|---|---|---|
| s | r | d | ne | nh | n800 | vd |
| 0 | INF | 0.170 | 1.52626 | 1.54042 | 1.51696 | 54.41 |
| 1 | INF | 13.244 | | | | |
| 2 | 20.4097 | 3.268 | 1.51825 | 1.52977 | 1.51032 | 64.14 |
| 3 | −22.1977 | 8.021 | | | | |
| 4 | 9.8755 | 3.090 | 1.43986 | 1.44647 | 1.43532 | 94.66 |
| 5 | −10.1728 | 1.733 | 1.51825 | 1.52977 | 1.51032 | 64.14 |
| 6 | 7.3477 | 2.746 | | | | |
| 7 | −5.7177 | 2.523 | 1.75844 | 1.77954 | 1.74454 | 52.32 |
| 8 | 36.266 | 2.977 | 1.43986 | 1.44647 | 1.43532 | 94.66 |
| 9 | −8.5226 | 0.471 | | | | |
| 10 | −20.1257 | 1.561 | 1.48915 | 1.49898 | 1.48224 | 70.23 |
| 11 | 20.4365 | 3.897 | 1.43986 | 1.44647 | 1.43532 | 94.66 |
| 12 | −18.1858 | 0.301 | | | | |
| 13 | 185.9612 | 3.570 | 1.49846 | 1.5072 | 1.49253 | 81.54 |
| 14 | −14.0427 | | | | | | s indicates a surface number; r, a radius of curvature (mm); d, a surface interval (mm); ne, a refractive index for an e line; nh, a refractive index for an h line; n800, a refractive index for light having a wavelength of 800 nm; vd, an Abbe number. These marks are also applicable to the embodiments described hereinafter. Surface numbers s0 and s1 respectively indicate an object surface (surface of cover glass CG on an object side) and a surface of the cover glass CG on an image side. Surface numbers s2 and s14 respectively indicate a lens surface that is the closest to an object among the lens surfaces of the objective 1 and a lens surface that is the closest to an image among the lens surfaces of the objective 1.

As indicated in the following, the objective 1 satisfies conditional expressions (1)-(4).

$$|\Delta z_1|/DOF_e = 0.31 \quad (1)$$

$$|\Delta z_2|/DOF_e = 0.62 \quad (2)$$

$$Y_{reso} \times |\beta| = 12.80 \text{ mm} \quad (3)$$

$$n_1 = 1.51825 \quad (4)$$

$$NA_{ob} = 0.160 \quad (5), (6), (8)$$

$$f_{ob}/f_1 = 2.136 \quad (7)$$

Figures 3A, 3B, 3C, 3D:
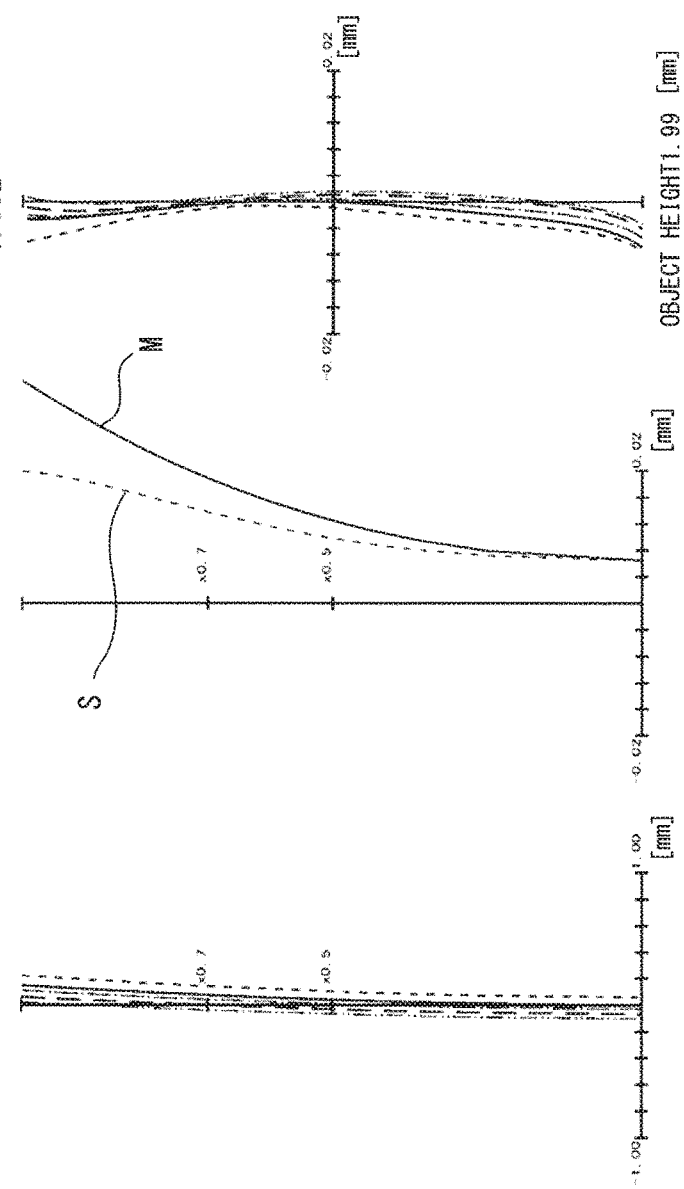
FIGS. 3A-3D are each an aberration diagram for the objective 1 depicted in FIG. 2.

FIGS. 3A-3D are each an aberration diagram for the objective 1 depicted in FIG. 2 and indicate aberrations that occur on an object surface when a pencil of infinitely distant light is incident from an image side. FIG. 3A is a spherical aberration diagram. FIG. 3B illustrates a sine-condition violation amount. FIG. 3C is an astigmatism diagram. FIG. 3D is a coma aberration diagram for a position with an object height ratio of 0.6 (object height 1.99 mm). "M" in the figures indicates a meridional component, and "S" indicates a sagittal component.

Second Embodiment

Figure 4:
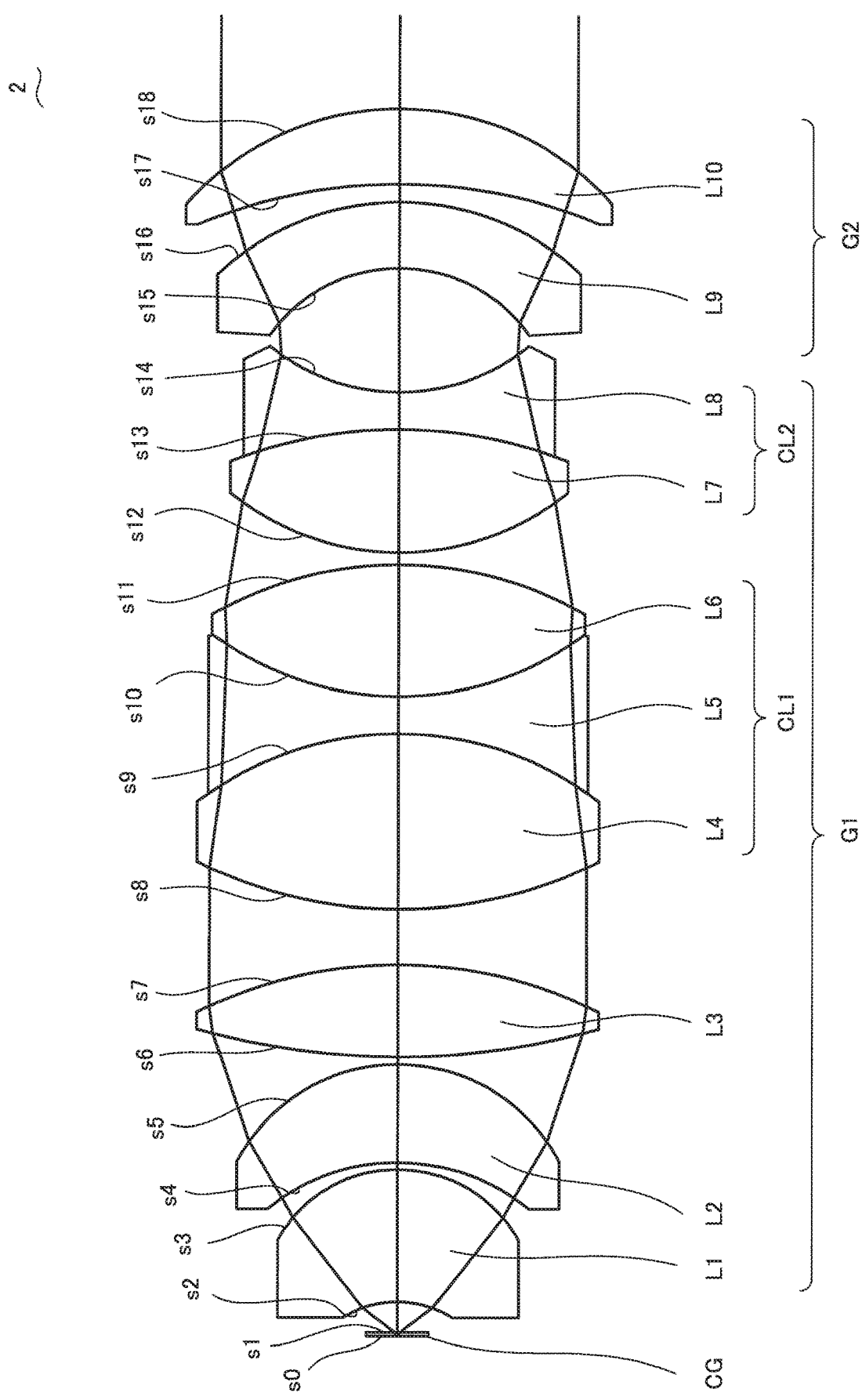
FIG. 4 is a cross-sectional view of an objective 2 in accordance with a second embodiment of the invention.

FIG. 4 is a cross-sectional view of an objective 2 in accordance with the present embodiment. The objective 2 includes: a first lens group G1 that includes a meniscus lens component that is the closest to an image among athe lens components of the first lens group G1, the meniscus lens component having a convex surface facing an object; and a second lens group G2 that is closer to the image than the first lens group G1 is. Note that the objective 2 is a dry microscope objective.

The first lens group G1 includes a lens L1 that is a meniscus lens having a concave surface facing the object, a lens L2 that is a meniscus lens having a concave surface facing the object, a lens L3 that is a biconvex lens, a cemented lens CL1, and a cemented lens CL2, wherein the object, the lens L1, the lens L2, the lens L3, the cemented lens CL1, and the cemented lens CL2 are arranged in this order.

The lens L1 is a first lens component of the objective 2. The cemented lens CL1 is a positive-negative-positive cemented triplet lens and consists of a lens L4 that is a biconvex lens, a lens L5 that is a biconcave lens, and a lens L6 that is a biconvex lens, wherein the object, the lens L4, the lens L5, and the lens L6 are arranged in this order. The cemented lens CL2 is a cemented doublet lens and consists of a lens L7 that is a biconvex lens and a lens L8 that is a biconcave lens, wherein the object, the lens L7, and the lens L8 are arranged in this order.

The second lens group G2 includes a lens L9 that is a meniscus lens having a concave surface facing the object and a lens L10 that is a meniscus lens having a concave surface facing the object, wherein the object, the lens L9, and the lens L10 are arranged in this order.

The following are various data on the objective 2, where $\Phi_1$ indicates the outer diameter of the lens L8, i.e., the lens that is the closest to the image among the lenses constituting the cemented lens CL2, wherein the cemented lens CL2 is the meniscus lens component that is the closest to the image among the lens components of the first lens group G1.

$NA_{ob}=0.800$, $f_{ob}=9.000$ mm, $|\Delta z_1|=0.02$ μm, $|\Delta z_2|=0.08$ μm, $DOF_e=0.43$ μm, $Y_{reso}=0.64$ mm, $|\beta|=20$, $n_1=1.77621$, $f_1=36.36$ mm, $f_{G1}=5.805$ mm, $f_{G2}=109.708$ mm, $\Phi_1=13$ mm The following are lens data of the objective 2.

| | | Objective 2 | | | | |
|---|---|---|---|---|---|---|
| s | r | d | ne | nh | n800 | vd |
| 0 | INF | 0.170 | 1.52626 | 1.54042 | 1.51696 | 54.41 |
| 1 | INF | 1.220 | | | | |
| 2 | −4.0367 | 5.316 | 1.77621 | 1.79917 | 1.76131 | 49.60 |
| 3 | −5.5638 | 0.278 | | | | |
| 4 | −8.3753 | 3.921 | 1.43986 | 1.44647 | 1.43532 | 94.66 |
| 5 | −7.3726 | 0.296 | | | | |
| 6 | 30.0778 | 3.701 | 1.43986 | 1.44647 | 1.43532 | 94.66 |
| 7 | −18.1688 | 2.218 | | | | |
| 8 | 18.2379 | 7.051 | 1.43986 | 1.44647 | 1.43532 | 94.66 |
| 9 | −13.3079 | 1.500 | 1.64132 | 1.66385 | 1.62703 | 42.41 |
| 10 | 12.5928 | 5.289 | 1.43986 | 1.44647 | 1.43532 | 94.66 |
| 11 | −15.1109 | 0.497 | | | | |
| 12 | 10.8229 | 4.943 | 1.43986 | 1.44647 | 1.43532 | 94.66 |
| 13 | −18.5 | 1.500 | 1.64132 | 1.66385 | 1.62703 | 42.41 |
| 14 | 8.2723 | 5.000 | | | | |
| 15 | −6.3912 | 2.646 | 1.74435 | 1.76491 | 1.73077 | 52.64 |
| 16 | −10.7265 | 0.731 | | | | |
| 17 | −20.9997 | 3.049 | 1.74341 | 1.77951 | 1.72245 | 32.26 |
| 18 | −11.4968 | | | | | |

As indicated in the following, the objective 2 satisfies conditional expressions (1)-(8), excluding conditional expression (7).

$$|\Delta z_1|/DOF_e = 0.05 \quad (1)$$

$$|\Delta z_2|/DOF_e = 0.19 \quad (2)$$

$$Y_{reso} \times |\beta| = 12.80 \text{ mm} \quad (3)$$

$$n_1 = 1.77621 \quad (4)$$

$$NA_{ob} = 0.8 \quad (5), (6), (8)$$

$$f_{ob}/f_1 = 0.248 \quad (7)$$

Figure 5:
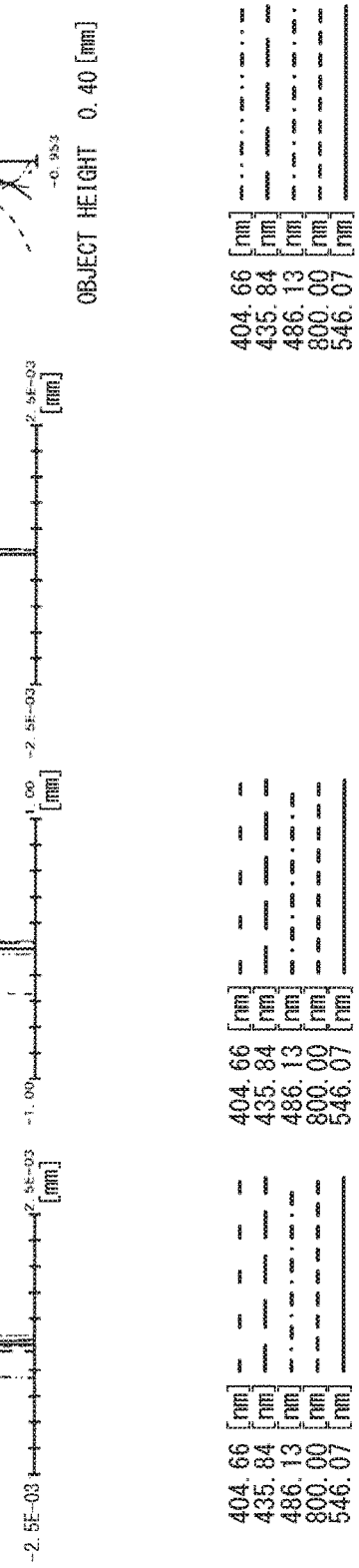
FIGS. 5A-5D are each an aberration diagram for the objective 2 depicted in FIG. 4.

FIGS. 5A-5D are each an aberration diagram for the objective 2 depicted in FIG. 4 and indicate aberrations that occur on an object surface when a pencil of infinitely distant light is incident from an image side. FIG. 5A is a spherical aberration diagram. FIG. 5B illustrates a sine-condition violation amount. FIG. 5C is an astigmatism diagram. FIG. 5D is a coma aberration diagram for a position with an object height ratio of 0.6 (object height 0.40 mm).

Third Embodiment

FIG. 6 is a cross-sectional view of an objective 3 in accordance with the present embodiment. The objective 3 includes: a first lens group G1 that includes a meniscus lens component that is the closest to an image among the lens components of the first lens group G1, the meniscus lens component having a convex surface facing an object; and a second lens group G2 that is closer to the image than the first lens group G1 is. Note that the objective 3 is a dry microscope objective.

The first lens group G1 includes a lens L1 that is a meniscus lens having a concave surface facing the object, a lens L2 that is a meniscus lens having a concave surface facing the object, a cemented lens CL1, a cemented lens CL2, a cemented lens CL3, and a cemented lens CL4, wherein the object, the lens L1, the lens L2, the cemented lens CL1, the cemented lens CL2, the cemented lens CL3, and the cemented lens CL4 are arranged in this order. Note that the cemented lens CL1 is a movable lens component capable of being moved along an optical axis.

The lens L1 is a first lens component of the objective 3. The cemented lens CL1 is a cemented doublet lens and consists of a lens L3 that is a biconcave lens and a lens L4 that is a biconvex lens, wherein the object, the lens L3, and the lens L4 are arranged in this order. The cemented lens CL2 is a cemented doublet lens and consists of a lens L5 that is a meniscus lens having a concave surface facing the image and a lens L6 that is a biconvex lens, wherein the object, the lens L5, and the lens L6 are arranged in this order. The cemented lens CL3 is a positive-negative-positive cemented triplet lens and consists of a lens L7 that is a biconvex lens, a lens L8 that is a biconcave lens, and a lens L9 that is biconvex lens, wherein the object, the lens L7, the lens L8, and the lens L9 are arranged in this order. The cemented lens CL4 is a cemented doublet lens and consists of a lens L10 that is a biconvex lens and a lens L11 that is a biconcave lens, wherein the object, the lens L10, and the lens L11 are arranged in this order.

The second lens group G2 includes a lens L12 that is a meniscus lens having a concave surface facing the object and a lens L13 that is a meniscus lens having a concave surface facing the object, wherein the object, the lens L12, and the lens L13 are arranged in this order.

The following are various data on the objective 3, where $\Phi_1$ indicates the outer diameter of the lens L11, i.e., the lens that is the closest to the image among the lenses constituting the cemented lens CL4, wherein the cemented lens CL4 is the meniscus lens component that is the closest to the image among the lens components of the first lens group G1.

$NA_{ob}$=0.945, $f_{ob}$=4.500 mm, $|\Delta z_1|$=0.04 μm, $|\Delta z_2|$=0.17 μm, $DOF_e$=0.31 μm, $Y_{reso}$=0.29 mm, $|\beta|$=40, $n_1$=1.77621, $f_1$=10.117 mm, $f_{G1}$=2.688 mm, $f_{G2}$=64.133 mm, $\Phi_1$=7 mm The following are lens data of the objective 3.

Objective 3

| s | r | d | ne | nh | n800 | vd |
|---|---|---|----|----|------|----|
| 0 | INF | t | 1.52626 | 1.54042 | 1.51696 | 54.41 |
| 1 | INF | d0 | | | | |
| 2 | −3.0339 | 3.681 | 1.77621 | 1.79917 | 1.76131 | 49.60 |
| 3 | −3.3487 | 0.200 | | | | |
| 4 | −7.2935 | 2.241 | 1.57098 | 1.58258 | 1.56334 | 71.30 |
| 5 | −5.5255 | D1 | | | | |
| 6 | −45.764 | 1.200 | 1.64132 | 1.66385 | 1.62703 | 42.41 |
| 7 | 12.7782 | 3.875 | 1.43986 | 1.44647 | 1.43532 | 94.66 |
| 8 | −14.198 | D2 | | | | |
| 9 | 71.1197 | 1.500 | 1.61664 | 1.63723 | 1.6035 | 44.49 |
| 10 | 15.0477 | 6.788 | 1.43986 | 1.44647 | 1.43532 | 94.66 |
| 11 | −10.4578 | 0.300 | | | | |
| 12 | 11.6236 | 6.847 | 1.43986 | 1.44647 | 1.43532 | 94.66 |
| 13 | −10.3782 | 1.550 | 1.48915 | 1.49898 | 1.48224 | 70.23 |
| 14 | 6.6859 | 4.219 | 1.43986 | 1.44647 | 1.43532 | 94.66 |
| 15 | −32.513 | 0.300 | | | | |
| 16 | 13.9497 | 4.787 | 1.49846 | 1.5072 | 1.49253 | 81.54 |
| 17 | −6.1667 | 1.000 | 1.88815 | 1.92092 | 1.86792 | 40.76 |
| 18 | 7.744 | 3.857 | | | | |
| 19 | −4.5391 | 1.541 | 1.51825 | 1.52977 | 1.51032 | 64.14 |
| 20 | −9.3597 | 0.873 | | | | |
| 21 | −12.8369 | 2.219 | 1.7434 | 1.77943 | 1.72248 | 32.33 |
| 22 | −7.2219 | | | | | |

Surface interval t, i.e., the interval between the surface identified as surface number s0 and the surface identified as surface number s1, indicates the thickness of cover glass CG and is thus a variable amount varied according to cover glass CG. Surface interval d0, i.e., the interval between the surface identified as surface number s1 and the surface identified as surface number s2, indicates an air interval between cover glass CG and the objective 3 and is thus a variable amount varied according to cover glass CG. Each of surface interval D1, i.e., the interval between the surface identified as surface number s5 and the surface identified as surface number s6, and surface interval D2, i.e., the interval between the surface identified as surface number s8 and the surface identified as surface number s9, indicates an air space between the movable lens component and a lens component adjacent thereto and is thus a variable amount varied according to the position of the movable lens component. The position of the movable lens component is adjusted according to, for example, the thickness of cover glass CG.

Relationships between the variable amounts are as follows:

| | t (cover glass thickness) | | |
|---|---|---|---|
| | 0.17 | 0.11 | 0.23 |
| d0 | 0.411 | 0.441 | 0.382 |
| D1 | 0.766 | 1.178 | 0.330 |
| D2 | 0.742 | 0.330 | 1.178 |

As indicated in the following, the objective 3 satisfies conditional expressions (1)-(8), excluding conditional expression (7).

$$|\Delta z_1|/DOF_e = 0.13 \quad (1)$$

$$|\Delta z_2|/DOF_e = 0.56 \quad (2)$$

$$Y_{reso} \times |\beta| = 11.60 \text{ mm} \quad (3)$$

$$n_1 = 1.77621 \quad (4)$$

$$NA_{ob} = 0.945 \quad (5), (6), (8)$$

$$f_{ob}/f_1 = 0.445 \quad (7)$$

Figure 7:
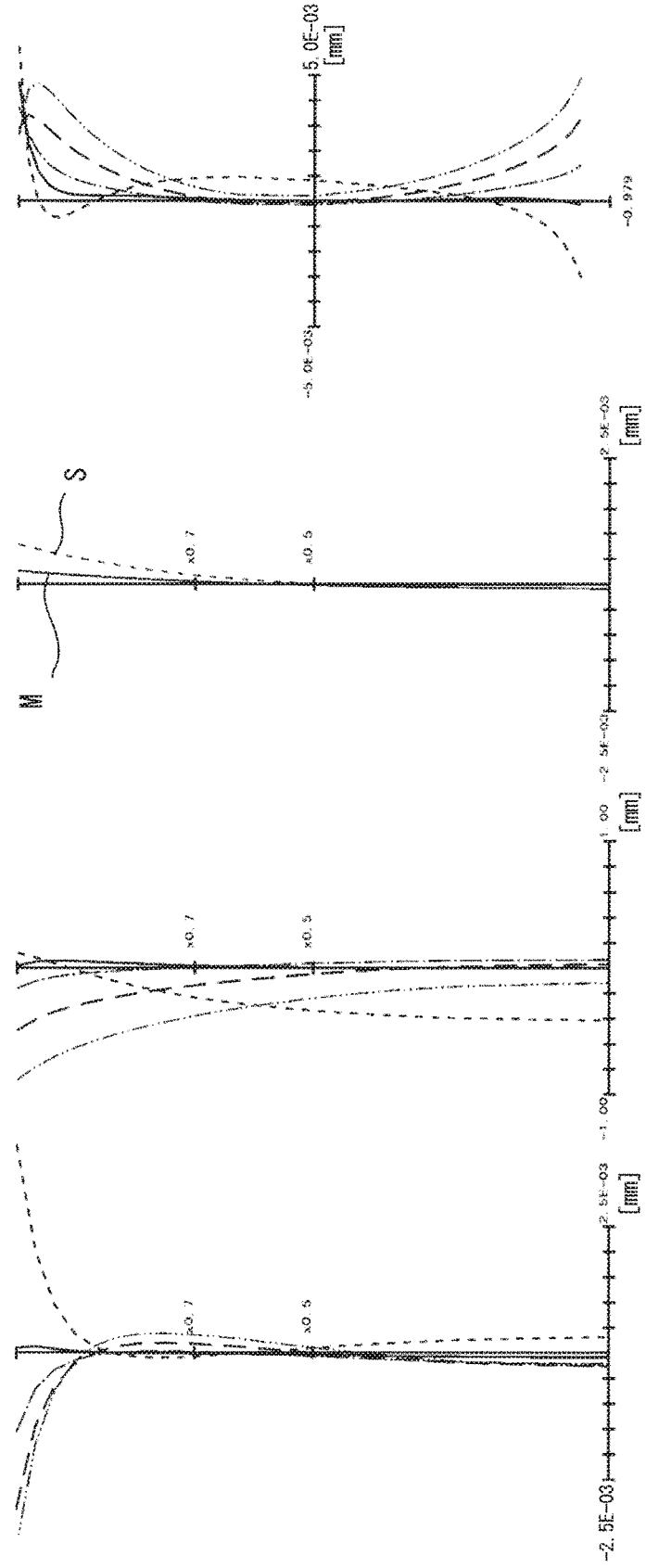
FIGS. 7A-7D are each an aberration diagram for the objective 3 depicted in FIG. 6.

FIGS. 7A-7D are each an aberration diagram for the objective 3 depicted in FIG. 6 and indicate aberrations that occur on an object surface when a pencil of infinitely distant light is incident from an image side. FIG. 7A is a spherical aberration diagram. FIG. 7B illustrates a sine-condition violation amount. FIG. 7C is an astigmatism diagram. FIG. 7D is a coma aberration diagram for a position with an object height ratio of 0.6 (object height 0.20 mm).

Fourth Embodiment

Figure 8:
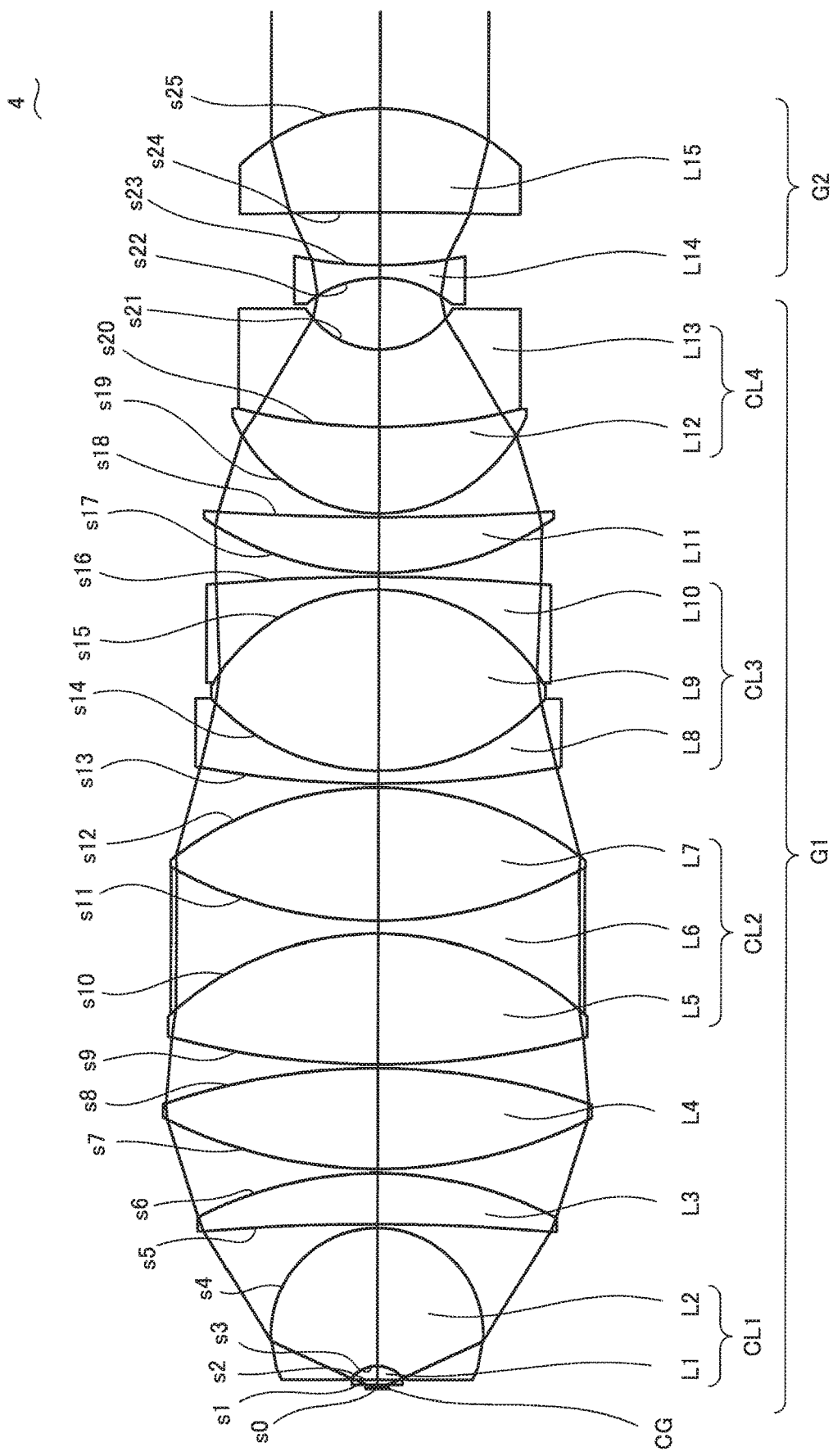
FIG. 8 is a cross-sectional view of an objective 4 in accordance with a fourth embodiment of the invention.

FIG. 8 is a cross-sectional view of an objective 4 in accordance with the present embodiment. The objective 4 includes: a first lens group G1 that includes a meniscus lens component that is the closest to an image among the lens components of the first lens group G1, the meniscus lens component having a convex surface facing an object; and a second lens group G2 that is closer to the image than the first lens group G1 is. Note that the objective 4 is an immersion microscope objective.

The first lens group G1 includes a cemented lens CL1, a lens L3 that is a meniscus lens having a concave surface facing the object, a lens L4 that is a biconvex lens, a cemented lens CL2, a cemented lens CL3, a lens L11 that is a meniscus lens having a concave surface facing the image, and a cemented lens CL4, wherein the object, the cemented lens CL1, the lens L3, the lens L4, the cemented lens CL2, the cemented lens CL3, the lens L11, and the cemented lens CL4 are arranged in this order.

The cemented lens CL1 is a first lens component of the objective 4. The cemented lens CL1 is a cemented doublet lens and consists of a lens L1 that is a planoconvex lens having a plane surface facing the object and a lens L2 that is a meniscus lens having a concave surface facing the object, wherein the object, the lens L1, and the lens L2 are arranged in this order. The cemented lens CL2 is a positive-negative-positive cemented triplet lens and consists of a lens L5 that is a biconvex lens, a lens L6 that is a biconcave lens, and a lens L7 that is a biconvex lens, wherein the object, the lens L5, the lens L6, and the lens L7 are arranged in this order. The cemented lens CL3 is a negative-positive-negative cemented triplet lens and consists of a lens L8 that is a meniscus lens having a concave surface facing the image, a lens L9 that is a biconvex lens, and a lens L10 that is a meniscus lens having a concave surface facing the object, wherein the object, the lens L8, the lens L9, and the lens L10 are arranged in this order. The cemented lens CL4 is a cemented doublet lens and consists of a lens L12 that is a meniscus lens having a concave surface facing the image and a lens L13 that is a meniscus lens having a concave surface facing the image, wherein the object, the lens L12, and the lens L13 are arranged in this order.

The second lens group G2 includes a lens L14 that is a biconcave lens and a lens L15 that is a meniscus lens having a concave surface facing the object, wherein the object, the lens L14, and the lens L15 are arranged in this order.

The following are various data on the objective 4, where $\Phi_1$ indicates the outer diameter of the lens L13, i.e., the lens that is the closest to the image among the lenses constituting the cemented lens CL4, wherein the cemented lens CL4 is the meniscus lens component that is the closest to the image among the lens components of the first lens group G1.

$NA_{ob}$=1.410, $f_{ob}$=2.999 mm, $|\Delta z_1|$=0.02 μm, $|\Delta z_2|$=0.22 μm, $DOF_e$=0.21 μm, $Y_{reso}$=0.18 mm, $|\beta|$=60, $n_1$=1.83945, $f_1$=9.544 mm, $f_{G1}$=2.511 mm, $f_{G2}$=−27.949 mm, $\Phi_1$=11.5 mm The following are lens data of the objective 4. The surface identified as surface number s1 and the surface identified as surface number s2 have a space therebetween that is filled with an immersion liquid.

| Objective 4 | | | | | | |
|---|---|---|---|---|---|---|
| s | r | d | ne | nh | n800 | vd |
| 0 | INF | 0.17 | 1.52626 | 1.54042 | 1.51696 | 54.41 |
| 1 | INF | 0.18 | 1.51793 | 1.53747 | 1.50657 | 41.00 |
| 2 | INF | 0.540 | 1.51825 | 1.52977 | 1.51032 | 64.14 |
| 3 | −1.319 | 5.348 | 1.83945 | 1.86893 | 1.82109 | 42.73 |
| 4 | −4.1166 | 0.150 | | | | |
| 5 | −78.3319 | 1.963 | 1.57098 | 1.58258 | 1.56335 | 71.30 |
| 6 | −14.9285 | 0.150 | | | | |
| 7 | 18.406 | 3.895 | 1.43986 | 1.44647 | 1.43532 | 94.66 |
| 8 | −25.3193 | 0.150 | | | | |
| 9 | 31.1937 | 5.046 | 1.43986 | 1.44647 | 1.43532 | 94.66 |
| 10 | −11.9163 | 0.500 | 1.64132 | 1.66385 | 1.62703 | 42.41 |
| 11 | 16.5897 | 5.162 | 1.43986 | 1.44647 | 1.43532 | 94.66 |
| 12 | −12.8588 | 0.150 | | | | |
| 13 | 38.1374 | 0.500 | 1.64132 | 1.66385 | 1.62703 | 42.41 |
| 14 | 8.9209 | 7.020 | 1.43986 | 1.44647 | 1.43532 | 94.66 |
| 15 | −7.4439 | 0.500 | 1.61664 | 1.63723 | 1.6035 | 44.49 |
| 16 | −71.7589 | 0.150 | | | | |
| 17 | 11.8705 | 2.165 | 1.57098 | 1.58258 | 1.56335 | 71.30 |
| 18 | 96.6908 | 0.150 | | | | |
| 19 | 6.2225 | 3.339 | 1.57098 | 1.58258 | 1.56334 | 71.30 |
| 20 | 21.2446 | 3.016 | 1.83945 | 1.86893 | 1.82109 | 42.73 |
| 21 | 3.3871 | 2.7792 | | | | |
| 22 | −4.4975 | 0.5 | 1.77621 | 1.79917 | 1.76131 | 49.60 |
| 23 | 15.9215 | 2.0396 | | | | |
| 24 | −160.5239 | 4.056 | 1.74341 | 1.77951 | 1.72245 | 32.26 |
| 25 | −7.7872 | | | | | |

As indicated in the following, the objective 4 satisfies conditional expressions (1)-(8).

$|\Delta z_1|/DOF_e$=0.10 (1)

$|\Delta z_2|/DOF_e$=1.06 (2)

$Y_{reso} \times |\beta|$=10.80 mm (3)

$n_1$=1.83945 (4)

$NA_{ob}$=1.41 (5), (6), (8)

$f_{ob}/f_1$=0.314 (7)

FIGS. 9A-9D are each an aberration diagram for the objective 4 depicted in FIG. 8 and indicate aberrations that occur on an object surface when a pencil of infinitely distant light is incident from an image side. FIG. 9A is a spherical aberration diagram. FIG. 9B illustrates a sine-condition violation amount. FIG. 9C is an astigmatism diagram. FIG. 9D is a coma aberration diagram for a position with an object height ratio of 0.6 (object height 0.13 mm).

Fifth Embodiment

Figure 10:
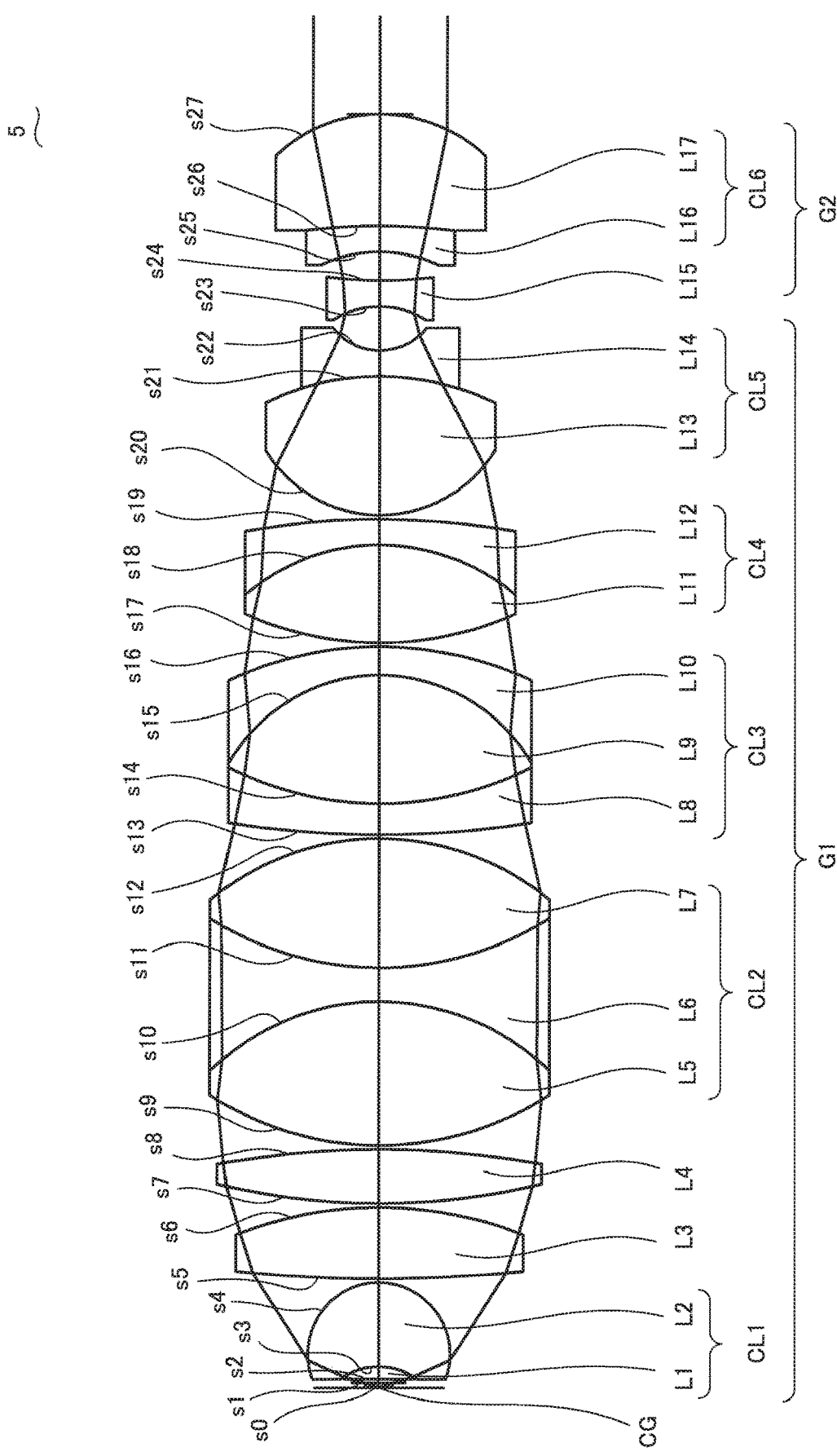
FIG. 10 is a cross-sectional view of an objective 5 in accordance with a fifth embodiment of the invention.

FIG. 10 is a cross-sectional view of an objective 5 in accordance with the present embodiment. The objective 5 includes: a first lens group G1 that includes a meniscus lens component that is the closest to an image among the lens components of the first lens group G1, the meniscus lens component having a convex surface facing an object; and a second lens group G2 that is closer to the image than the first lens group G1 is. Note that the objective 5 is an immersion microscope objective.

The first lens group G1 includes a cemented lens CL1, a lens L3 that is a biconvex lens, a lens L4 that is a biconvex lens, a cemented lens CL2, a cemented lens CL3, a cemented lens CL4, and a cemented lens CL5, wherein the object, the cemented lens CL1, the lens L3, the lens L4, the cemented lens CL2, the cemented lens CL3, the cemented lens CL4, and the cemented lens CL5 are arranged in this order.

The cemented lens CL1 is a first lens component of the objective 5. The cemented lens CL1 is a cemented doublet lens and consists of a lens L1 that is a planoconvex lens having a plane surface facing the object and a lens L2 that is a meniscus lens having a concave surface facing the object, wherein the object, the lens L1, and the lens L2 are arranged in this order. The cemented lens CL2 is a positive-negative-positive cemented triplet lens and consists of a lens L5 that is a biconvex lens, a lens L6 that is a biconcave lens, and a lens L7 that is a biconvex lens, wherein the object, the lens L5, the lens L6, and the lens L7 are arranged in this order. The cemented lens CL3 is a negative-positive-negative cemented triplet lens and consists of a lens L8 that is a meniscus lens having a concave surface facing the image, a lens L9 that is a biconvex lens, and a lens L10 that is a meniscus lens having a concave surface facing the object, wherein the object, the lens L8, the lens L9, and the lens L10 are arranged in this order. The cemented lens CL4 is a cemented doublet lens and consists of a lens L11 that is a biconvex lens and a lens L12 that is a meniscus lens having a concave surface facing the object, wherein the object, the lens L11, and the lens L12 are arranged in this order. The cemented lens CL5 is cemented doublet lens and consists of a lens L13 that is a biconvex lens and a lens L14 that is a biconcave lens, wherein the object, the lens L13, and the lens L14 are arranged in this order.

The second lens group G2 includes a lens L15 that is a biconcave lens and a cemented lens CL6, wherein the object, the lens L15, and the cemented lens CL6 are arranged in this order. The cemented lens CL6 is cemented doublet lens and consists of a lens L16 that is a meniscus lens having a concave surface facing the object and a lens L17 that is a meniscus lens having a concave surface facing the object, wherein the object, the lens L16, and the lens L17 are arranged in this order.

The following are various data on the objective 5, where $\Phi_1$ indicates the outer diameter of the lens L14, i.e., the lens that is the closest to the image among the lenses constituting the cemented lens CL5, wherein the cemented lens CL5 is the meniscus lens component that is the closest to the image among the lens components of the first lens group G1.

$NA_{ob}=1.453$, $f_{ob}=1.800$ mm, $|\Delta z_1|=0.13$ μm, $|\Delta z_2|=0.18$ μm, $DOF_e=0.20$ μm, $Y_{reso}=0.11$ mm, $|\beta|=100$, $n_1=1.80811$, $f_1=4.191$ mm, $f_{G1}=2.048$ mm, $f_{G2}=-12.116$ mm, $\Phi_1=7$ mm The following are lens data of the objective 5. The surface identified as surface number s1 and the surface identified as surface number s2 have a space therebetween that is filled with an immersion liquid.

| Objective 5 | | | | | | |
|---|---|---|---|---|---|---|
| s | r | d | ne | nh | n800 | vd |
| 0 | INF | 0.17 | 1.52626 | 1.54042 | 1.51696 | 54.41 |
| 1 | INF | 0.15 | 1.51793 | 1.53747 | 1.50657 | 41.00 |
| 2 | INF | 0.490 | 1.51825 | 1.52977 | 1.51032 | 64.14 |
| 3 | −2.5256 | 3.245 | 1.80811 | 1.83385 | 1.79174 | 46.53 |
| 4 | −2.758 | 0.150 | | | | |
| 5 | 57.0411 | 2.739 | 1.57098 | 1.58258 | 1.56335 | 71.30 |
| 6 | −15.1633 | 0.150 | | | | |
| 7 | 26.7162 | 2.064 | 1.43986 | 1.44647 | 1.43532 | 94.66 |
| 8 | −34.6539 | 0.150 | | | | |
| 9 | 12.0693 | 5.530 | 1.43986 | 1.44647 | 1.43532 | 94.66 |
| 10 | −9.3615 | 1.300 | 1.64132 | 1.66385 | 1.62703 | 42.41 |
| 11 | 12.289 | 4.960 | 1.43986 | 1.44647 | 1.43532 | 94.66 |
| 12 | −10.2507 | 0.150 | | | | |
| 13 | 38.3223 | 1.200 | 1.75844 | 1.77954 | 1.74454 | 52.32 |
| 14 | 12.9929 | 4.935 | 1.43986 | 1.44647 | 1.43532 | 94.66 |
| 15 | −6.7513 | 1.100 | 1.75844 | 1.77954 | 1.74454 | 52.32 |
| 16 | −13.8019 | 0.150 | | | | |
| 17 | 12.8304 | 3.778 | 1.43986 | 1.44647 | 1.43532 | 94.66 |
| 18 | −8.0374 | 1.000 | 1.75844 | 1.77954 | 1.74454 | 52.32 |
| 19 | −28.8995 | 0.150 | | | | |
| 20 | 5.1902 | 5.3476 | 1.57098 | 1.58258 | 1.56335 | 71.30 |
| 21 | −10.1104 | 1 | 1.64132 | 1.66385 | 1.62703 | 42.41 |
| 22 | 2.3315 | 1.7 | | | | |
| 23 | −3.3075 | 1 | 1.75844 | 1.77954 | 1.74454 | 52.32 |
| 24 | 16.1481 | 1.1 | | | | |
| 25 | −5.4713 | 1 | 1.51825 | 1.52977 | 1.51032 | 64.14 |
| 26 | −22.079 | 4.3375 | 1.7434 | 1.77943 | 1.72248 | 32.33 |
| 27 | −5.8878 | | | | | |

As indicated in the following, the objective 5 satisfies conditional expressions (1)-(8).

$$|\Delta z_1|/DOF_e=0.66 \quad (1)$$

$$|\Delta z_2|/DOF_e=0.92 \quad (2)$$

$$Y_{reso}\times|\beta|=11.00 \text{ mm} \quad (3)$$

$$n_1=1.80811 \quad (4)$$

$$NA_{ob}=1.453 \quad (5), (6), (8)$$

$$f_{ob}/f_1=0.429 \quad (7)$$

FIGS. 11A-11D are each an aberration diagram for the objective 5 depicted in FIG. 10 and indicate aberrations that occur on an object surface when a pencil of infinitely distant light is incident from an image side. FIG. 11A is a spherical aberration diagram. FIG. 11B illustrates a sine-condition violation amount. FIG. 11C is an astigmatism diagram. FIG. 11D is a coma aberration diagram for a position with an object height ratio of 0.6 (object height 0.08 mm).

What is claimed is:

1. An objective comprising:
   a first lens group that includes a meniscus lens component that is closest to an image among lens components of the first lens group, the meniscus lens component having a convex surface facing an object; and
   a second lens group that is closer to the image than the first lens group is, wherein
   the objective satisfies the following conditional expressions:

$$0\leq|\Delta z_1|/DOF_e\leq1.5 \quad (1)$$

$$0\leq|\Delta z_2|/DOF_e\leq2 \quad (2)$$

where $\Delta z_1$ indicates a difference between a position on an optical axis at which an RMS wavefront aberration in an h line is minimized and a position on the optical axis at which an RMS wavefront aberration in an e line is minimized, $\Delta z_2$ indicates a difference between a position on the optical axis at which an RMS wavefront aberration in light having a wavelength of 800 nm is minimized and the position on the optical axis at which an RMS wavefront aberration in the e line is minimized, and $DOF_e$ indicates a depth of focus for the e line.

2. The objective of claim 1, wherein
the first lens group includes a first lens component that is closest to the object among the lens components of the first lens group, the first lens component having a convex surface facing the image,
the objective satisfies the following conditional expression:

$$1.5\leq n_1\leq1.85 \quad (4)$$

where $n_1$ indicates a highest of refractive indexes that lenses included in the first lens component have for the e line.

3. The objective of claim 2, wherein
the second lens group includes a plurality of lens components.

4. The objective of claim 2, further comprising:
a cemented triplet lens, wherein
the objective satisfies the following conditional expression:

$$0.5\leq NA_{ob} \quad (5)$$

where $NA_{ob}$ indicates a numerical aperture of an object side of the objective.

5. The objective of claim 1, wherein
the second lens group includes a plurality of lens components.

6. The objective of claim 5, further comprising:
a cemented triplet lens, wherein
the objective satisfies the following conditional expression:

$$0.5\leq NA_{ob} \quad (5)$$

where $NA_{ob}$ indicates a numerical aperture of an object side of the objective.

7. The objective of claim 1, further comprising:
a cemented triplet lens, wherein
the objective satisfies the following conditional expression:

$$0.5 \leq NA_{ob} \qquad (5)$$

where $NA_{ob}$ indicates a numerical aperture of an object side of the objective.

8. The objective of claim 7, wherein
the cemented triplet lens consists of a negative lens and two positive lenses having the negative lens situated therebetween.

9. The objective of claim 1, wherein
the objective is an immersion objective, and
the objective satisfies the following conditional expressions:

$$1 \leq NA_{ob} \qquad (6)$$

$$-0.2 \leq f_{ob}/f_1 \leq 0.43 \qquad (7)$$

where $NA_{ob}$ indicates a numerical aperture of an object side of the objective, $f_{ob}$ indicates a focal length that the objective has for the e line, and $f_1$ indicates a focal length that the first lens component has for the e line.

10. The objective of claim 1, wherein
the objective is a dry objective,
the objective further comprises at least one lens component capable of being moved along the optical axis, and
the objective satisfies the following conditional expression:

$$0.85 \leq NA_{ob} < 1 \qquad (8)$$

where $NA_{ob}$ indicates a numerical aperture of an object side of the objective.

11. An objective comprising:
a first lens group that includes a meniscus lens component that is closest to an image among lens components of the first lens group, the meniscus lens component having a convex surface facing an object; and
a second lens group that is closer to the image than the first lens group is, wherein
the objective satisfies the following conditional expressions:

$$0 \leq |\Delta z_1|/DOF_e \leq 1.5 \qquad (1)$$

$$9 \text{ mm} \leq Y_{reso} \times |\beta| \leq 20 \text{ mm} \qquad (3)$$

where $\Delta z_1$ indicates a difference between a position on an optical axis at which an RMS wavefront aberration in an h line is minimized and a position on the optical axis at which an RMS wavefront aberration in an e line is minimized, $DOF_e$ indicates a depth of focus for the e line, $Y_{reso}$ indicates a maximum object height within a region on a plane orthogonal to the optical axial that crosses the position on the optical axis at which an RMS wavefront aberration in the e line is minimized, the region having an RMS wavefront aberration in the e line that is $0.2\lambda_e$ or less provided therewithin, $\lambda_e$ indicates a wavelength of the e line, and $\beta$ indicates a magnification of the objective.

12. The objective of claim 11, wherein
the first lens group includes a first lens component that is closest to the object among the lens components of the first lens group, the first lens component having a convex surface facing the image,
the objective satisfies the following conditional expression:

$$1.5 \leq n_1 \leq 1.85 \qquad (4)$$

where $n_1$ indicates a highest of refractive indexes that lenses included in the first lens component have for the e line.

13. The objective of claim 12, wherein
the second lens group includes a plurality of lens components.

14. The objective of claim 12, further comprising:
a cemented triplet lens, wherein
the objective satisfies the following conditional expression:

$$0.5 \leq NA_{ob} \qquad (5)$$

where $NA_{ob}$ indicates a numerical aperture of an object side of the objective.

15. The objective of claim 11, wherein
the second lens group includes a plurality of lens components.

16. The objective of claim 15, further comprising:
a cemented triplet lens, wherein
the objective satisfies the following conditional expression:

$$0.5 \leq NA_{ob} \qquad (5)$$

where $NA_{ob}$ indicates a numerical aperture of an object side of the objective.

17. The objective of claim 11, further comprising:
a cemented triplet lens, wherein
the objective satisfies the following conditional expression:

$$0.5 \leq NA_{ob} \qquad (5)$$

where $NA_{ob}$ indicates a numerical aperture of an object side of the objective.

18. The objective of claim 17, wherein
the cemented triplet lens consists of a negative lens and two positive lenses having the negative lens situated therebetween.

19. The objective of claim 11, wherein
the objective is an immersion objective, and
the objective satisfies the following conditional expressions:

$$1 \leq NA_{ob} \qquad (6)$$

$$-0.2 \leq f_{ob}/f_1 \leq 0.43 \qquad (7)$$

where $NA_{ob}$ indicates a numerical aperture of an object side of the objective, $f_{ob}$ indicates a focal length that the objective has for the e line, and $f_1$ indicates a focal length that the first lens component has for the e line.

20. The objective of claim 11, wherein
the objective is a dry objective,
the objective further comprises at least one lens component capable of being moved along the optical axis, and
the objective satisfies the following conditional expression:

$$0.85 \leq NA_{ob} < 1 \qquad (8)$$

where $NA_{ob}$ indicates a numerical aperture of an object side of the objective.

* * * * *